United States Patent [19]

Piland et al.

[11] Patent Number: 5,538,366
[45] Date of Patent: Jul. 23, 1996

[54] ACCELERATOR RING

[75] Inventors: Evan R. Piland, Stow; Mark DePietro, Canton, both of Ohio

[73] Assignee: Diebold, Incorporated, Canton, Ohio

[21] Appl. No.: 339,033

[22] Filed: Nov. 14, 1994

[51] Int. Cl.$^6$ ................................................ B65G 51/06
[52] U.S. Cl. ............................ 406/190; 384/10; 384/16
[58] Field of Search ........................ 406/184, 185, 406/186, 187, 188, 189, 190; 384/10, 16; 92/249; 277/230

[56] References Cited

U.S. PATENT DOCUMENTS

| | | | |
|---|---|---|---|
| 669,890 | 3/1901 | Bogardus | 406/189 |
| 860,947 | 7/1907 | Upp et al. | 406/188 |
| 1,902,856 | 3/1933 | Jackson | 406/187 |
| 2,014,446 | 9/1935 | Needham | 406/190 |
| 3,787,008 | 1/1974 | Barnett et al. | 243/35 |
| 4,042,190 | 8/1977 | Ueno | 243/32 |
| 4,324,511 | 4/1982 | Irish | 406/190 |
| 4,385,852 | 5/1983 | Mossler | 406/190 |
| 5,181,807 | 1/1993 | Anders | 406/190 |

*Primary Examiner*—Gary C. Hoge
*Attorney, Agent, or Firm*—D. Peter Hochberg; Mark Kusner; Michael Jaffe

[57] ABSTRACT

A wear ring constructed for use with a pneumatic tube system carrier of a type having two spaced apart wear rings positioned near the axial ends of the carrier. The wear ring is comprised of a rigid, yet flexible, annular support member having an outer cylindrical surface. A layer of woven fabric selected from the group consisting of cotton, wool, or felt is bonded to the cylindrical surface of the support member. The fabric material preferably has a coefficient of friction with the interior transfer tube not greater than 0.35.

3 Claims, 2 Drawing Sheets

ACCELERATOR RING

FIELD OF THE INVENTION

The present invention relates generally to the pneumatic transfer systems for conveying articles in a carrier through a tube, and more particularly, to an accelerator ring for carriers used in such systems.

BACKGROUND OF THE INVENTION

In a typical pneumatic transfer system, an article carrier is propelled by air pressure between two spaced-apart terminals through an elongated transfer tube. The carrier is propelled through the transfer tube by creating a pressure differential across the carrier, the carrier being propelled forward by a higher air pressure behind a carrier than exists in front of it. The pressure differential may be created by a blower system forcing air into the transfer tube behind a carrier (thereby creating increased pressure behind the carrier) or by creating a vacuum in front of the carrier (thereby reducing pressure ahead of the carrier).

A carrier is generally cylindrical in shape and typically includes spaced-apart wear rings, conventionally referred to as "accelerator rings", which surround the carrier and generally seal the carrier against the inner surface of the transfer tube. The accelerator rings engage the inner surface of the transfer tube and typically support the weight of carrier as it travels through the tube. An accelerator ring may be made from a wide variety of materials. The type of material used for an accelerator ring is generally based upon the size of the carrier and the weight to be carried thereby. In this respect, soft resilient materials, such as felt or belting, may be used for small diameter carriers transferring relatively small loads. For large weight-carrying carriers, hard rubber or rubber reinforced leather belting is normally used.

In the past, most transfer tubes were constructed from commercially available, standard, metal tubes. In recent years, however, it has been known to form transfer tubes from plastic tubing because of its light weight, and the relative ease of installing such material. Polyvinyl chloride (PVC) tubing has found particular acceptance in pneumatic tube systems because of its commercial availability and its relatively low cost.

A problem with the use of PVC tubing, however, is that it is apparently not compatible with accelerator rings known heretofore. Specifically, a powdered residue is produced within the terminals of pneumatic transfer systems utilizing PVC tubing. In addition, noticeable wear of the accelerator ring is produced on carriers used in such systems. It is believed that these problems are caused by the PVC being abraded by the accelerator ring, and further by friction generated between the accelerator rings and the inner surface of the PVC tubing which creates sufficient heat to breakdown the inner surface of the PVC tubing. In this respect, it was noted that conventional accelerator rings, which are typically formed of rubber-impregnated belting or a NYLON synthetic Velcro® strip, causes the inner surface of PVC tubing to breakdown. In this respect, solid PVC is relatively soft material having a combination of amorphous and crystalline regions. It is believed that heat generated between the accelerator ring and the surface of the tubing, as well as the abrasive effects of the harder belting or nylon, causes the amorphous regions of the PVC tubing to break down, thereby causing thin layers or particles of the PVC to peal away from the inner surface of the tubing. These layers or particles breakdown into dust and particulate as they are driven by the accelerator rings (and by the differential pressure) through the transfer tube. The dust or powder eventually collects and settles within the terminals and on the carrier itself. As will be appreciated, this is particularly undesirable in pneumatic tube systems used by the general public, such as in pneumatic systems used by financial institutions.

Accelerator rings made of felt do not exhibit the problems set forth above when used in PVC tubing, and therefor are suitable for use in small-load carrying pneumatic tube system. The production of felt, however, produces undesirable and hazardous by-product, and it is believed that in the near future the production of such material may be banned or restricted. It is therefore desirous to develop a non-felt accelerator ring which does not abrade or break down plastic tubing.

The present invention overcomes these and other problems and provides an accelerator ring for a carrier used in a pneumatic tube system, which accelerator ring reduces the wear and friction created between the ring and the surface of a pneumatic tube system by utilizing a soft, non-abrasive material having a relatively low coefficient of friction.

SUMMARY OF THE INVENTION

In accordance with the present invention there is provided a wear ring for use on a pneumatic tube system carrier of a type having two spaced apart wear rings positioned near the axial ends of the carrier. The wear ring is comprised of an annular support member having an outer cylindrical surface. A layer of woven material fabric, selected from the group consisting of cotton or wool, is bonded to the cylindrical surface of the support member. The fabric material preferably has a coefficient of friction not greater than 0.35.

In accordance with another aspect of the present invention there is provided an accelerator ring for use on a pneumatic tube carrier. The accelerator ring includes an annular ring having a cylindrical inner surface for mounting to a pneumatic tube carrier and a cylindrical outer surface. The ring is formed of a rubber material having a Durometer hardness of approximately 55. An intermediate layer of a tightly woven fabric is bonded to said cylindrical outer surface of the ring. An outer layer of cotton is secured to the intermediate layer of fabric by an adhesive/sealant material.

In accordance with another aspect of the present invention there is provided an accelerator ring for use on a pneumatic tube system carrier comprised of an annular support member extending outward from said carrier having an outward facing cylindrical surface. The support member is integrally formed as part of the carrier and includes a layer of tightly woven cotton fabric bonded to the cylindrical surface.

It is an object of the present invention is to provide an accelerator ring for use in pneumatic transfer tube systems utilizing PVC tubing.

Another object of the present invention is to provide accelerator ring as described above which reduces the breakdown of the PVC tubing.

Another object of the present invention is to provide an accelerator ring as described above which is formed of a soft, yet durable material.

Another object of the present invention is to provide an accelerator ring as described above utilizing a woven natural fabric as the wear surface.

These and other objects and advantages will become apparent from the following description of a preferred embodiment taken together with the accompanying drawings.

BRIEF DESCRIPTION OF THE DRAWINGS

The invention may take physical form in certain parts and arrangement of parts, a preferred embodiment of which will be described in detail in the specification and illustrating the accompanying drawings which form a part thereof and wherein.

DETAILED DESCRIPTION OF PREFERRED EMBODIMENT

Figure 1:
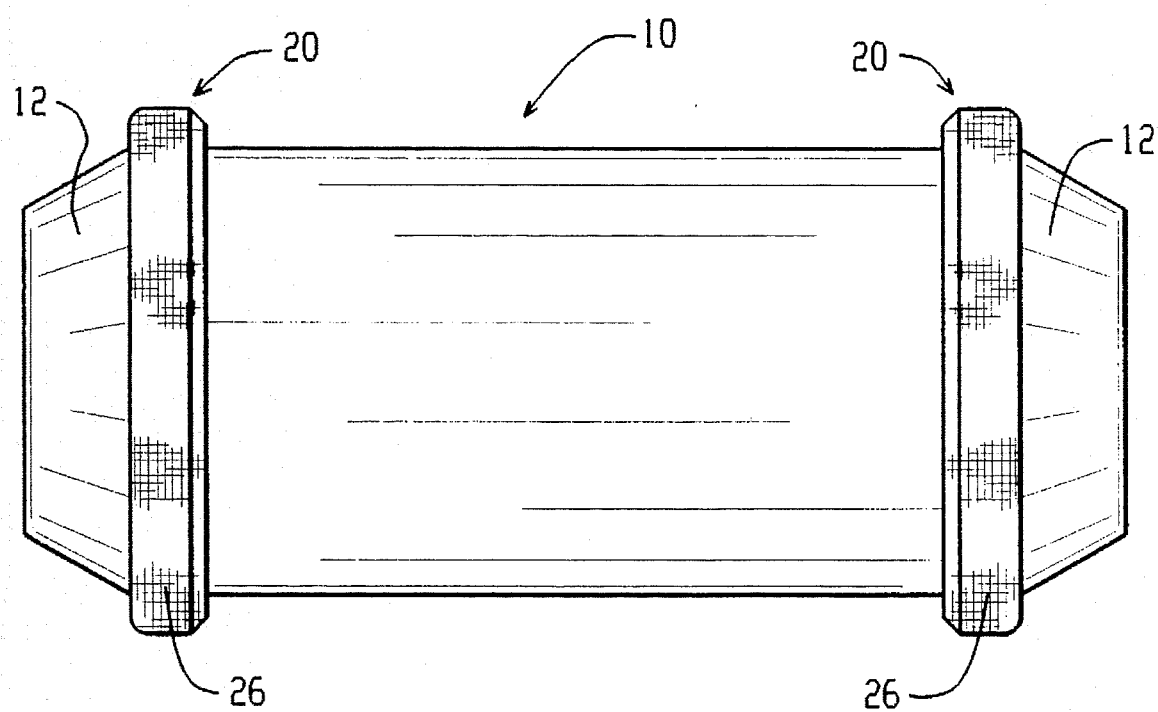
FIG. 1 is a perspective view of an article carrying carrier for use in a pneumatic tube system illustrating a preferred embodiment of the present invention.

Referring now to the drawings wherein the showing is for the purpose of illustrating preferred embodiments of the invention only and not for the purpose of limiting same, FIG. 1 is a perspective view of an article carrying carrier 10 for use in a pneumatic tube system (not shown) illustrating a preferred embodiment of the present invention.

Carrier 10 in and of itself forms no part of the present invention and, therefore, shall not be described in great detail. In the embodiment shown, carrier 10 is generally cylindrical in shape and has two tapered end caps 12, which are openable or removable (by means not shown) to allow access to the article carrying interior cavity of carrier 10. Carrier 10 is preferably formed of a lightweight plastic composition.

Two spaced apart wear rings 20 (conventionally referred to as "accelerator rings") are mounted to carrier 10 at each end thereof. According to the present invention, wear rings 20 are comprised of an annular molded base member 22 having an intermediate fabric layer 24 secured to the outer surfaces thereof. An outer fabric layer 26 is secured to intermediate layer 24 by an adhesive sealant 28.

Base member 22 is generally hoop shaped, and is symmetrical about a central axis. Base member 22 has a prismatic cross section defined by a cylindrical inner surface 32, a cylindrical outer surface 34, an annular side surface 36, a shorter annular side surface 38, and an inclined conical surface 42. Where cylindrical outer surface 34 meets annular side surface 36, base member is rounded to form a smooth countered edge 44. In the embodiment shown, the angle between cylindrical outer surface 34 and inclined conical surface 42 is approximately 135°. Base member 22 is preferably formed of a rigid, yet flexible material. Natural rubber, having a Durometer hardness of 55, has been found to be a suitable material for forming base member 22.

Intermediate fabric layer 24 is provided as a barrier between base member 22 and outer fabric layer 26. In this respect, intermediate layer 24 is preferably applied during formation of base member 22, wherein intermediate layer 24 is preformed into the desired shape of base member 22 with rubber forming base member 22 being applied thereto. Intermediate layer 24 adheres to base member 22 during the forming process. Intermediate layer 24 preferably has a density which prevents penetrating therethrough during the forming process of the rubber forming base member 22. In other words, intermediate layer 24 is provided as an aid to shaping and forming base 22 and as a barrier layer to isolate the material forming base member 22 from outer fabric layer 26. In the embodiment shown, intermediate layer is formed of rubber impregnated fabric, also known as a friction fabric.

Outer fabric layer 26 is preferably a single sheet of woven cloth material secured to intermediate fabric layer 24 by an adhesive/sealant 28, such as a hot glue adhesive or a pressure sensitive adhesive. Outer fabric layer 26 is preferably secured to intermediate fabric layer 24 such that the annular outer surface of outer fabric layer 26 is smooth and wrinkle free. In this respect, it will be appreciated that as a flat fabric sheet is wrapped over and around cylindrical outer surface 34, folds or bunches of fabric will be formed along annular surface 36 and conical surface 42. Importantly, conical surface 42 and rounded edge 44 of base member 22 are provided to facilitate securing fabric 26 to base member 22 so as to reduce the folds or bunches of fabrics formed during such process. In this respect, conical surface 42 provides greater surface area as compared to annular surface 36 which is generally perpendicular to the outer cylindrical surface 34. This greater surface area reduces the amount of wrinkles or distortion in the cloth fabric by providing additional surface area on which to press or smooth the fabric material. As will be appreciated, a fabric material may stretch and compress to a certain degree to conform to the 3-dimensional shape of base member 22. Nevertheless, the greater the surface area provided to accept the cloth material, the less folds or wrinkles will be produced thereon. Fabric layer 26 is preferably a woven fabric preferably formed from a natural material and in the embodiment shown is formed of cotton. More specifically, outer layer 26 is formed of a 20 ounce, 100% cotton duck material having a tight-weave with a smooth outer surface.

As indicated above, the present invention is preferably for use in pneumatic transfer tube systems utilizing PVC tubing. In this respect, it has been found that an important aspect of eliminating the abrasion and pealing condition described above, is to utilize a material having a low coefficient of friction and a hardness which is less than the hardness of PVC.

With respect to the cotton fabric material described above, it is believed that several characteristics inherent in such material reduces the likelihood of abrading the surface of PVC tubing. In one respect, it is believed that the general open spaces of the woven cotton fabric reduces the overall surface contact between the fabric and the surface of the PVC tubing. In addition, the natural fiber of cotton is believed to minimize heat during the operation of the system because of its relatively low coefficient of friction with the PVC tubing. Further, the hardness of the cotton is less than other manmade materials. As a result, it has been found that woven cloth formed of a cotton material is particularly efficient as an outer layer for an accelerator ring used with PVC tubing.

Importantly, it was found that a material's coefficient of sliding friction was not alone determinative of a material's suitability as the bearing surface of an accelerator ring. In this respect, the coefficient of sliding friction of cotton was test to be approximately 0.23 which was less than felt (which tested between 0.27 and 0.31 depending upon the shape of the ring and carrier used). Although felt had a higher coefficient of sliding friction, as noted previously, felt did not abrade or break down the inner lining of PVC tubing. On the other hand, NYLON synthetic (in the form of VELCRO®) was found to have the lowest coefficient of sliding friction, approximately 0.19, when used as an accelerator ring in a PVC tube. Yet NYLON synthetic accelerator rings produced the surface breakdown and undesirable particulate noted above. Thus, the coefficient of sliding friction alone is not determinative of a suitable material.

Accordingly, it was found that a woven cotton duck had a sufficiently low coefficient of friction and a softness which made it a suitable alternative to felt and a material which has the durability to withstand use as the bearing surface of an accelerator ring in a pneumatic transfer tube system.

Figure 3:
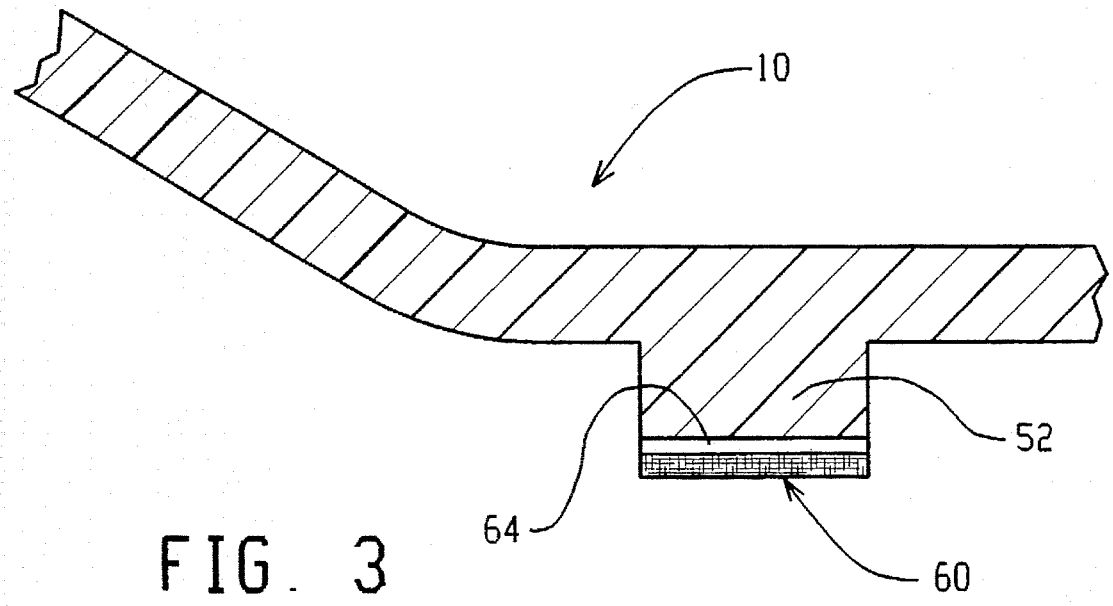
FIG. 3 is a partial sectional view of a carrier and an accelerator ring illustrating an alternate embodiment of the present invention.
Figure 2:
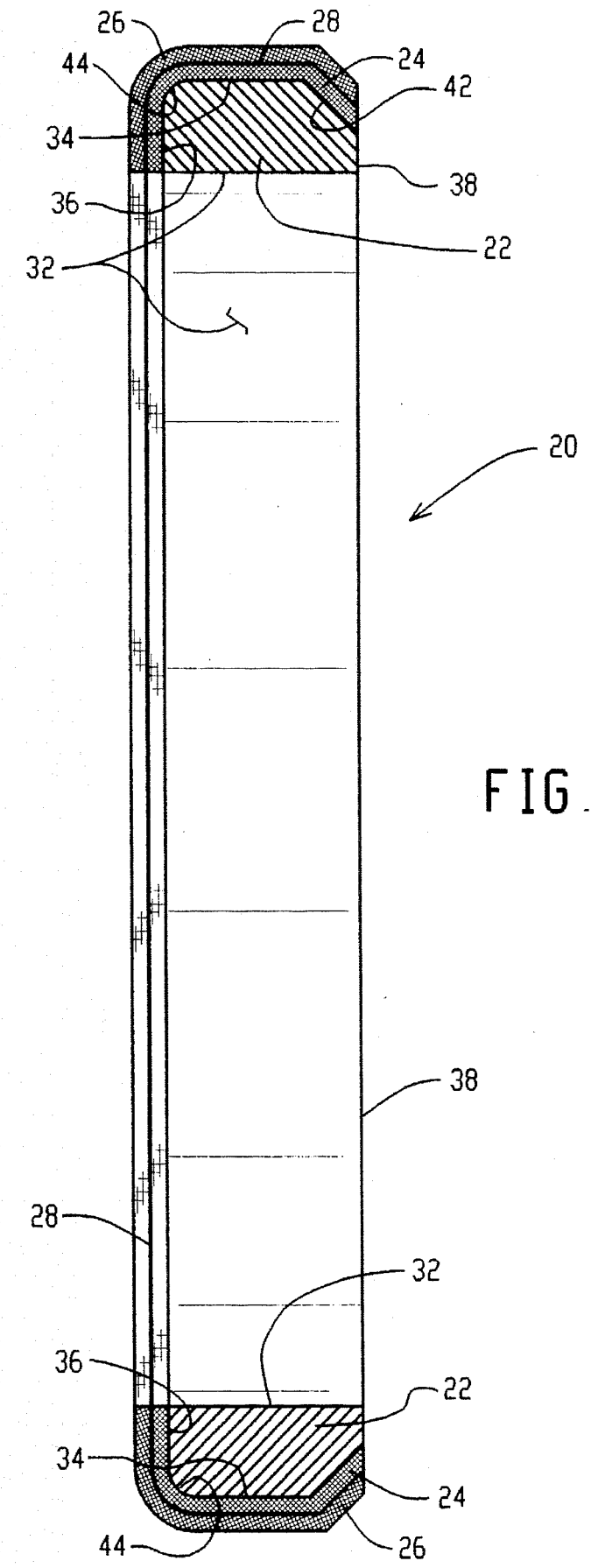
FIG. 2 is a sectional view taken along lines 2—2 of FIG. 1.

Referring now to FIG. 3, an alternate embodiment of the present invention is shown. In this embodiment, the carrier body is molded to have an outward extending annular wall 52 which extends beyond the outer peripheral surface of carrier 10. Onto wall 52, a strip of woven cloth designated 60 in the drawings is secured by a layer of adhesive material 64. Strip 60 is preferably formed of a woven cotton material of a type heretofore described.

The present invention thus provides an accelerator ring for use in plastic tubing. The relatively low coefficient of friction of cotton together with its inherent soft characteristic provides an accelerator ring which does not abrade or break down the inner surface of PVC tubing as does conventional accelerator rings formed of NYLON synthetic or rubberized belting.

The present invention has been described with respect to preferred embodiments. Modifications and alterations will occur to others upon the reading and understanding of the specification. It is intended that all such modifications and alterations be included insofar as the come within the scope of the patent as claimed with equivalents thereof.

Having thus described the invention, the following is claimed:

1. An accelerator ring for use on a pneumatic tube carrier comprised of:

an annular ring having a cylindrical inner surface for mounting to a pneumatic tube carrier and a cylindrical outer surface, said ring formed of a rubber material having a Durometer hardness of approximately 55;

an annular intermediate layer of a tightly woven fabric having a cylindrical outer surface and a cylindrical inner surface, said inner surface of said intermediate layer extending parallel to said cylindrical outer surface of said ring and being bonded thereto;

an annular outer layer of cotton having a cylindrical inner surface extending parallel to said outer surface of said intermediate layer of fabric, and being bonded thereto by an adhesive/sealant material.

2. An accelerator ring as defined in claim 1 wherein said outer layer of cotton is a woven duck.

3. An accelerator ring as defined in claim 2 wherein said woven duck is a 20 ounce duck.

\* \* \* \* \*